Oct. 22, 1929.  H. N. LORENZ ET AL  1,732,521
MEAT CUTTING MACHINE
Filed Oct. 18, 1926   2 Sheets-Sheet 2

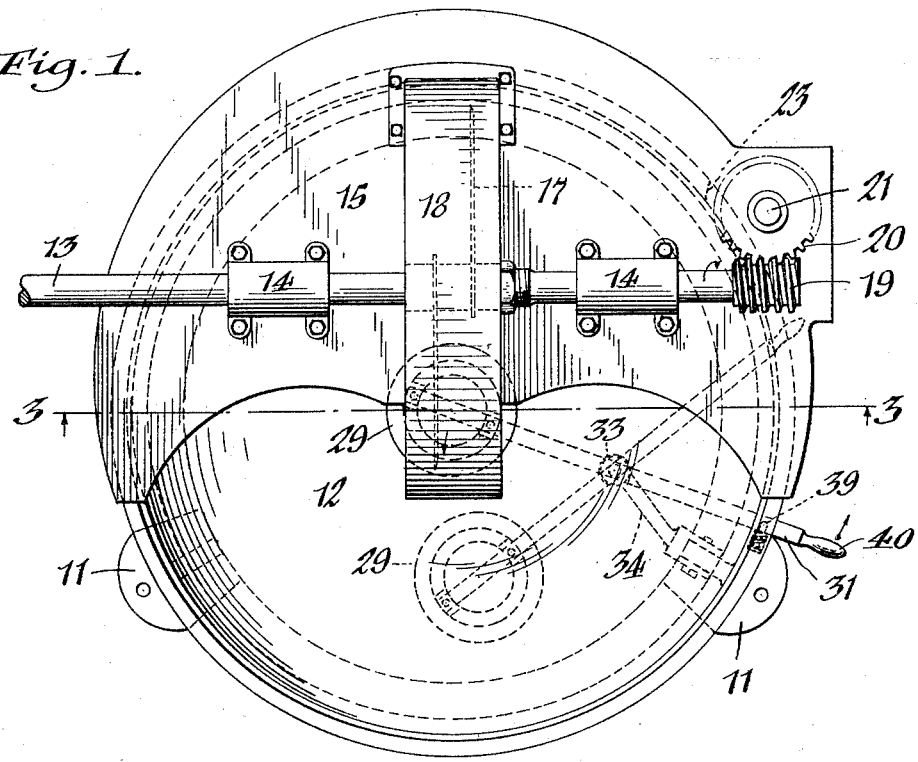

Inventors
Herbert N. Lorenz,
Lucas L. Lorenz,
by Geyer & Geyer
Attorneys.

Patented Oct. 22, 1929

1,732,521

UNITED STATES PATENT OFFICE

HERBERT N. LORENZ AND LUCAS L. LORENZ, OF WOODHAVEN, NEW YORK

MEAT-CUTTING MACHINE

Application filed October 18, 1926. Serial No. 142,195.

This invention relates generally to improvements in meat cutting machines of the rotary bowl type but more particularly to the means for effecting the removal of the bowl contents.

One of its objects is the provision of simple, inexpensive and sanitary means for permitting a thorough and expeditious dumping of the meat from the bowl without the operator's hands coming in contact therewith.

A further object of the invention is to provide a centrally-disposed dumping mechanism for meat-cutting machines of this character which is so organized and arranged that it does not interfere with the normal operation of the machine, which is easy to operate and clean, and which is not liable to get out of order.

Figure 3:
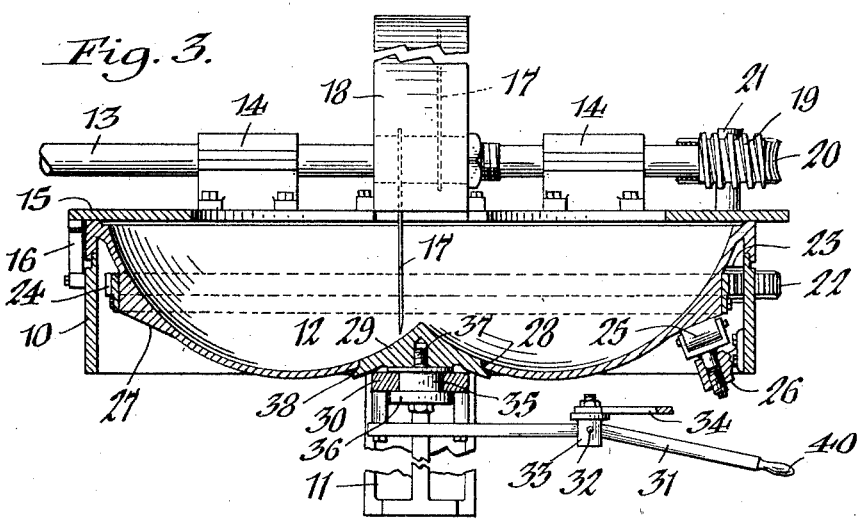
Figure 4:
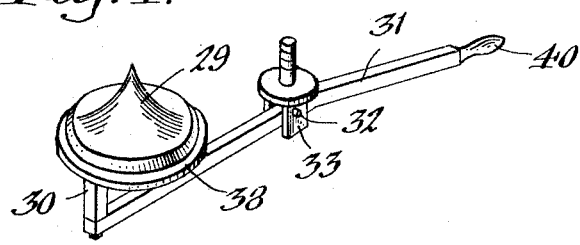

In the accompanying drawings:—Figure 1 is a top plan view of a meat cutting machine equipped with our invention. Figure 2 is a front view thereof. Figure 3 is a transverse vertical section on line 3—3, Fig. 1. Figure 4 is a perspective view of the discharge plug and its operating lever. Figure 5 is a perspective view of the swivel bracket for the operating lever.

Similar characters of reference indicate corresponding parts throughout the several views.

By way of example, our invention is shown in connection with a meat cutting machine consisting of a circular support or bed-ring 10 supported on legs 11. Rotatably mounted within and sustained on this bed-ring is the meat bowl 12 which is of the customary concavo-convex form. The numeral 13 indicates the drive shaft of the machine which is arranged transversely thereof and is journaled in bearings 14, 14 carried by a cover plate 15 arranged over the rear portion of the bowl and supported by brackets 16 secured to the bed-ring. Mounted on this shaft and extending into the bowl is the usual cutter 17 enclosed by a protecting hood or guard 18.

In addition to driving the cutter 17, the shaft 13 also serves to rotate the bowl 12. To this end, said shaft carries a worm 19 which meshes with a worm wheel 20 fixed on the upper end of an upright shaft 21 journaled on the bed-ring 10. At its lower end, this upright shaft has a gear 22 partially extending through an opening 23 in the bed-ring and meshing with a ring gear 24 applied to the periphery of the meat-bowl. Anti-friction rollers 25 carried by brackets 26 and engaging the finished underface 27 of the meat bowl serve to support the latter and permit its rotation with a minimum of resistance.

The meat bowl 12 is provided in its bottom with a centrally-arranged discharge opening 28 through which the chopped meat is dumped into a suitable receptacle provided for receiving it. This discharge opening is normally closed by a plug 29 whose top portion is conical to conform to the curvature of the bottom wall of the meat bowl, as shown in Fig. 3. Said plug is so supported that it can be withdrawn downwardly out of the discharge opening and shifted laterally to one side thereof to its dumping position shown by dotted lines in Fig. 1, while in its closed position shown in Fig. 3, the plug is adapted to revolve with the meat bowl independently of its supporting mechanism. To accomplish these results, the plug 29 is revolubly mounted on a support 30 secured to the inner end of a vertically-swinging lever 31 fulcrumed intermediate its ends on a horizontal pivot pin 32 carried by a horizontally-swiveling bracket 33 mounted on an arm 34 or similar support secured to the adjacent leg 11 or other fixed part of the machine. Interposed between the plug and its support is a roller or similar bearing 35. A thrust collar 36 is arranged beneath the support 30 and is held in place by a bolt 37 engaging the plug 29. The latter is provided with an annular rim or flange 38, which, in the closed possition of the plug, bears against the underside of the meat bowl. By thus mounting the plug and arranging it concentrically with the axis of the bowl 12, it is permitted to revolve freely therewith independently of its support 30. The plug-operating lever 31 may be held in its normally operative position by a suitable catch, that shown in Fig. 1 of the drawings, by way of example, being in the form of a springpressed bolt or plunger 39 arranged to interlock with the outer arm of said lever.

When it is desired to discharge the chopped meat through the opening 28 of the bowl into the receptacle arranged beneath it, the lever 31 is released from its locking bolt 39 and its handle end 40 is lifted to withdraw the plug 29 from said opening, whereupon it is shifted laterally to the position shown by dotted lines in Fig. 1, where it is out of the path of the falling meat. The meat may be scraped or otherwise cleaned from the walls of the bowl and thence directed through its discharge opening. The conical shape of the plug prevents any meat from lodging on it and the moment the same is withdrawn from the opening, the meat thereon drops into the receptacle.

The cutters 17 may be so arranged that they will partly revolve over the opening 28, thereby assisting in the discharge of the contents from the bowl 12.

We claim as our invention:—

1. In a meat cutting machine, the combination of a rotary bowl having a discharge opening for the meat, a support disposed at the discharge side of said opening and movable toward and from the same and laterally thereof in a horizontal plane, and a closure for the discharge opening carried by said support to revolve with said bowl independently of the support.

2. In a meat cutting machine, the combination of a rotary bowl having a discharge opening in its bottom, a plug for said opening, and a radially arranged actuating member carrying said plug and disposed beneath said bowl and movable both vertically and horizontally relatively to the opening.

3. In a meat cutting machine, the combination of a rotary bowl having a concentrically-arranged discharge opening in its bottom, a combined vertically and laterally swinging lever disposed radially beneath said bowl, and a plug for said opening rotatably mounted on the inner end of said lever and revolvable with the bowl.

4. In a meat cutting machine, the combination of a rotary bowl having a concentrically-arranged discharge opening in its bottom, a horizontally-swiveling bracket arranged beneath the bowl, a vertically swinging lever fulcrumed on said bracket, and a plug for said opening rotatably mounted on said lever.

5. In a meat cutting machine, the combination of a rotary bowl having a concentrically-arranged discharge opening in its bottom, a support disposed beneath the bowl and movable both vertically and horizontally relatively to its opening, a closure rotatably mounted on said support and movable therewith into and out of the discharge opening, and means for holding the support in position to hold said plug closed.

6. In a meat cutting machine, the combination of a bed-ring, a rotary bowl sustained on said bed-ring and having a central meat discharge opening in its bottom, a support disposed beneath the bowl and movable both vertically and horizontally relatively to its opening, a closure rotatably mounted on said support and movable therewith into and out of the discharge opening, and means for rotating said bowl, said means being located in a plane above the closure and its support.

HERBERT N. LORENZ.
LUCAS L. LORENZ.